Feb. 14, 1933.  F. O. HOAGLAND  1,897,666
MACHINE TOOL SPINDLE
Filed Sept. 5, 1930
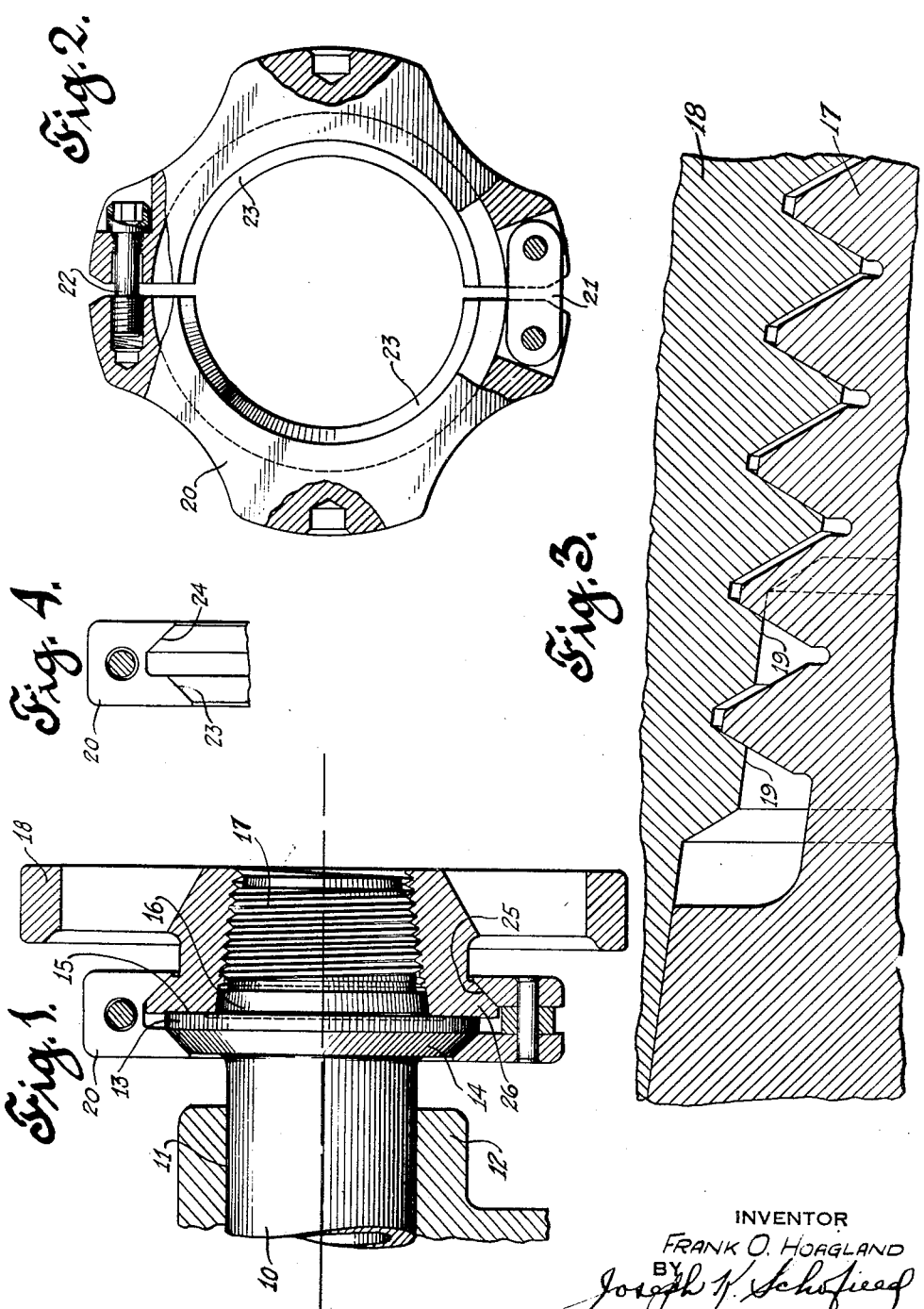
INVENTOR
FRANK O. HOAGLAND
BY
Joseph W. Schofield
ATTORNEY Patented Feb. 14, 1933

1,897,666

UNITED STATES PATENT OFFICE

FRANK O. HOAGLAND, OF WEST HARTFORD, CONNECTICUT, ASSIGNOR TO PRATT & WHITNEY COMPANY, OF NEW YORK, N. Y., A CORPORATION OF NEW JERSEY

MACHINE TOOL SPINDLE

Application filed September 5, 1930. Serial No. 479,942.

This invention relates to spindles adapted for machine tools and particularly to means upon one end of the spindle for attaching a chuck or other means to support and rotate a work piece.

An object of the present invention is to improve the present form of means for attaching chucks and driving members upon lathe or other machine tool spindles enabling them to be readily mounted or dismounted relatively to the spindle and to rigidly clamp them in position when mounted thereon.

Another object of the invention is to provide a connecting and supporting means for a work mounting and driving member enabling the member to be firmly and rigidly mounted on a work supporting and rotating spindle but readily detached therefrom, the member always being mounted on the spindle concentrically and for rotation upon its own longitudinal axis.

With these and other objects in view, my invention includes the features of construction and operation set forth in the following specification and illustrated in the accompanying drawing.

In the accompanying drawing annexed hereto and forming a part of this specification, I have shown my invention embodied in a lathe spindle of medium size on which is mounted a work driver or chuck adapter, but it will be understood that the invention can be otherwise embodied and that the drawing is not to be construed as defining or limiting the scope of the invention, the claims appended to this specification being relied upon for that purpose.

In the drawing:

Figure 1 is a side elevation of one end of a lathe spindle provided with the present invention, a work rotating driving member being shown mounted thereon.

Fig. 2 is a front elevation of the clamping ring connecting the driving member and the spindle rigidly together.

Fig. 3 is an enlarged view of the bearing surfaces and threaded connections between the lathe spindle and the work supporting or driving member, and Fig. 4 is a detail view of a part of the clamping ring.

In the above mentioned drawing I have shown but one embodiment of the invention which is now deemed preferable, but it is to be understood that changes and modifications may be made within the scope of the appended claims without departing from the spirit of the invention.

Briefly and in its preferred aspect my invention may include the following principal parts: First, a flange provided on the lathe or machine tool spindle adjacent its front bearing; second, a short conical bearing surface on the spindle adjacent to and upon the opposite side of the flange from the bearing surface; third, screw threads adjacent the conical bearing surface and extending to the free end of the spindle; and fourth, a clamping ring preferably comprising hinged semicircular members adapted to be clamped together for engaging opposed beveled surfaces respectively on the flange and a work rotating or driving member to rigidly retain the work driver or chuck in fixed position upon the spindle.

Referring more in detail to the figures of the drawing, I provide the work spindle 10 with a journal portion 11 adapted to engage within a suitable bearing 12 adjacent one end. Adjacent this journal portion 11 is a flange 13 integral with the spindle and having a bevel surface 14 on that face toward the journal portion 11 and a plane surface 15 normal to the axis of the spindle 10 on its opposite surface. Adjacent this face 15 of the flange 13 is a conical bearing surface 16 extending directly to and intersecting the bearing face 15 of the flange. Beyond the taper bearing surface 16 and extending to the free end of the spindle 10 are screw threads 17, those shown being slightly tapered. The conical bearing surface 16 and the tapered threads 17 are concentric to the axis of spindle 10 and particularly to the journal surface 11 of the spindle.

Mounted upon the spindle 10 is a work driving member 18, in this instance shown as a simple work driver, but it is obvious that it may form an adapter for a chuck or other rotating and supporting means for work pieces to be mounted and rotated upon a fixed axis. This work driver 18 is provided with an internal conical surface adapted to closely fit the conical bearing surface 16 on the spindle 10 in a manner permitting the end face of the work driving member 18 to lie in close contact with the bearing face 15 of the flange 13. The work driving member 18 also has screw threads similarly tapered to those on the spindle, but upon an internal surface so that the driving member 18 may be threaded directly upon the end of the spindle 10 and forced into contact with the conical bearing surface 16 and against the face 15 of the flange 13.

In order to facilitate mounting the driving member 18 upon the spindle 10 several of the threads on the work driving member 18 disposed adjacent the bearing surface when in connected position may be cut away as shown at 19 in Fig. 3 enabling the work driving member 18 to be readily placed over several of the threads on the outer end of the spindle 10 when mounting the driving member upon the spindle. With the member 18 loosely in place upon the screw threads 17 it may rapidly be spun into position with one end face against the surface 15 of flange 13.

In order to rigidly clamp the driving member 18 or a chuck adapter in place thereof in position upon the spindle 10, a clamping ring 20 is provided shown clearly in Figs. 1 and 2. This clamping ring 20 comprises two generally similar semi-circular halves hinged together as shown in Fig. 2 by the short link 21. These semi-circular members are adapted to be clamped together by means of a bolt or clamping screw 22 housed within one member and entering screw threads in the other member. Both members of the clamping ring 20 are provided with an oblique or conical bearing surface 23 adapted to fit the conical or beveled surface 14 on one side of the flange 13 and also with an opposed conical bearing surface 24 for the bevel or conical bearing surface 25 on a small flange 26 on the work driving member 18. It will be seen from this construction that by tightening the semi-circular members 20 about the flanges 13 and 26 on the spindle 10 and work driving member 18 respectively, the work driving member 18 will be held rigidly against its bearing surface 15 on the flange 13 and also will be held securely against rotation.

What I claim is:

1. An attaching means for chucks and the like on driving spindles, comprising in combination, a spindle having a flange formed thereon, a conical bearing portion adjacent said flange, a threaded portion adjacent and extending beyond said conical bearing portion whereby a work supporting member may be threaded upon said spindle against said flange, centralized on said bearing surface and secured on said spindle in fixed position, and a ring adapted to surround said flange and a portion of said member when in position on said spindle to form a supplemental retaining means therefor.

2. An attaching means for chucks and the like on driving spindles, comprising in combination, a spindle having a flange formed thereon, a beveled surface on said flange, a conical bearing portion adjacent said flange, a threaded portion adjacent and extending beyond said conical bearing portion whereby a work supporting member having a conical opening fitting said conical bearing surface may be threaded upon said spindle against said flange, and a clamping ring adapted to engage said beveled surface on said flange and a portion of said member when in position on said spindle for securing said member in fixed position thereon.

3. An attaching means for chucks and the like on driving spindles comprising in combination, a spindle, a flange formed thereon having an abutment normal to the axis of said spindle, a conical bearing portion adjacent said flange, and a threaded portion adjacent and extending beyond said conical bearing portion, said flange having a beveled surface opposed to said abutment whereby a work supporting member having a beveled flange thereon may be threaded upon said spindle with its flange against the abutment of said flange, and a clamping ring engaging said beveled surfaces on the flanges for securing said member in fixed position on said spindle.

4. A spindle and work supporting member assembly comprising in combination, a spindle having a flange formed thereon, a conical bearing portion adjacent said flange and a threaded portion adjacent said bearing portion, a work supporting member on said spindle having an opening therein engaging said conical bearing and having a threaded portion engaging said threaded portion on said spindle, said threaded portion on said work supporting member having portions of its threads cut away whereby said work supporting member may be readily threaded upon said spindle against said flange, centralized on said bearing surface and secured on said spindle against said flange in fixed position.

5. A spindle and work supporting member assembly comprising in combination, a spindle having a flange formed thereon, a conical bearing portion adjacent said flange, and a threaded portion of tapered form adjacent said bearing portion, a work supporting member on said spindle having an axially extending tapered opening therethrough engaging said conical bearing at one end thereof, a portion of said opening being threaded to engage said taper threaded portion on said spindle, said threaded portion on said member having portions of its threads cut away whereby said work supporting member may be readily threaded upon said spindle against said flange, centralized on said conical bearing portion and secured on said spindle against said flange in fixed position.

6. An attaching means for work supporting members and the like on driving spindles, comprising in combination, a spindle having a flange formed thereon, a conical bearing portion adjacent said flange and a threaded portion adjacent said conical bearing portion, a work supporting member on said spindle engaging said conical bearing surface, a threaded portion on said member engaging the threaded portion on said spindle, said threaded portion on said member having portions of its threads cut away whereby said member may be readily threaded upon said spindle against said flange, centralized on said bearing surface and secured on said spindle against said flange, and a two-part ring adapted to engage portions of said flange and member and be clamped in position thereon to retain said member in fixed position on said spindle.

In testimony whereof, I hereto affix my signature.

FRANK O. HOAGLAND.